(12) United States Patent
Lin

(10) Patent No.: US 10,831,997 B2
(45) Date of Patent: Nov. 10, 2020

(54) INTENT CLASSIFICATION METHOD AND SYSTEM

(71) Applicant: CloudMinds Technology, Inc., Santa Clara, CA (US)

(72) Inventor: Ruixi Lin, Sunnyvale, CA (US)

(73) Assignee: CloudMinds Technology, Inc., Santa Clara, CA (US)

( * ) Notice: Subject to any disclaimer, the term of this patent is extended or adjusted under 35 U.S.C. 154(b) by 191 days.

(21) Appl. No.: 16/059,034

(22) Filed: Aug. 9, 2018

(65) Prior Publication Data

US 2020/0050667 A1    Feb. 13, 2020

(51) Int. Cl.

| | |
|---|---|
| *G06F 17/27* | (2006.01) |
| *G06F 40/279* | (2020.01) |
| *G06N 3/08* | (2006.01) |
| *G06F 16/35* | (2019.01) |
| *G06F 40/30* | (2020.01) |
| *G06F 40/129* | (2020.01) |
| *G10L 15/16* | (2006.01) |

(Continued)

(52) U.S. Cl.

CPC ............ *G06F 40/279* (2020.01); *G06F 16/35* (2019.01); *G06F 40/129* (2020.01); *G06F 40/30* (2020.01);

(Continued)

(58) Field of Classification Search

CPC ........ G06F 40/30; G06F 40/242; G06F 40/35; G06F 40/111; G06F 40/205; G06F 40/211; G06F 40/232; G06F 40/284; G06F 40/295; G06F 40/44; G06F 40/45; G06F 40/47; G06F 40/56; G06F 40/10; G06F 40/129; G06F 40/169; G06F 40/279; G06F 40/40; G06F 40/58; G06N 3/0454; G06N 3/0445; G06N 3/08; G06N 3/084; G06N 3/006; G06N 3/0472; G06N 3/082; G06N 5/022; G06N 20/00; G06N 3/04; G06N 3/088; G06N 5/046; G10L 15/16; G10L 15/063; G10L 15/18; G10L 15/02; G10L 15/14; G10L 15/1815; G10L 15/19; G10L 15/20; G10L 15/22; G10L 25/30; G10L 13/04; G10L 13/086; G10L 15/197

(Continued)

(56) References Cited

U.S. PATENT DOCUMENTS 9,544,098 B2 * 1/2017 Kasahara .................. H04L 1/08
9,672,814 B2 * 6/2017 Cao ........................ G06N 20/00
(Continued)

FOREIGN PATENT DOCUMENTS

WO    WO2019229768 A1 *  5/2019 ............... G06F 9/44
WO    WO 2019/229768 A1 * 12/2019

*Primary Examiner* — Vijay B Chawan
(74) *Attorney, Agent, or Firm* — Syncoda LLC; Feng Ma

(57) ABSTRACT

An intent classification method and a system for realizing the intent classification method are provided. The intent classification method can be used for determining an intent class of a sentence input in a language containing information-bearing characters, such as Chinese. The method specifically comprises a step of obtaining at least one set of word embeddings and character embeddings from the sentence input to thereby generate at least one set of integrated word-character embeddings, and a step of determining an intent class corresponding to the sentence input based on the at least one set of integrated word-character embeddings. Herein, each of the at least one set of integrated word-character embeddings corresponds to one of the at least one set of word embeddings and character embeddings.

20 Claims, 9 Drawing Sheets

(51) Int. Cl.
*G10L 15/06* (2013.01)
*G10L 15/18* (2013.01)

(52) U.S. Cl.
CPC .............. *G06N 3/084* (2013.01); *G10L 15/16* (2013.01); *G10L 15/063* (2013.01); *G10L 15/18* (2013.01)

(58) Field of Classification Search
USPC ........ 704/9, 251, 257, 270, 275, 270.1, 202, 704/259, 232
See application file for complete search history.

(56) References Cited

U.S. PATENT DOCUMENTS

| | | | | |
|---|---|---|---|---|
| 9,836,453 | B2* | 12/2017 | Radford | G06F 40/284 |
| 9,892,113 | B2* | 2/2018 | Cross, III | G06F 40/30 |
| 9,898,458 | B2* | 2/2018 | Cross, III | G06F 40/211 |
| 9,917,904 | B1* | 3/2018 | Cheng | G06F 3/167 |
| 10,049,106 | B2* | 8/2018 | Goyal | G06F 40/35 |
| 10,270,862 | B1* | 4/2019 | Cheng | G06F 3/167 |
| 10,460,036 | B2* | 10/2019 | Duong | G06F 40/242 |
| 10,540,964 | B2* | 1/2020 | Lee | G10L 15/02 |
| 2004/0246237 | A1* | 12/2004 | Asakawa | G06F 16/3344 |
| | | | | 345/171 |
| 2010/0265257 | A1* | 10/2010 | Mowatt | G06F 3/167 |
| | | | | 345/467 |
| 2018/0075343 | A1* | 3/2018 | van den Oord | G10L 13/086 |
| 2018/0137855 | A1* | 5/2018 | Lee | G10L 15/063 |
| 2018/0203848 | A1* | 7/2018 | Perez | G06F 40/30 |
| 2018/0203852 | A1* | 7/2018 | Goyal | G06N 3/006 |
| 2018/0268023 | A1* | 9/2018 | Korpusik | G06N 3/0445 |
| 2018/0307679 | A1* | 10/2018 | Duong | G06F 40/205 |

\* cited by examiner

INTENT CLASSIFICATION METHOD AND SYSTEM

TECHNICAL FIELD

The present disclosure relates generally to the field of semantic technologies, and more specifically to an intent classification method and system.

BACKGROUND

The task of multiclass user intent classification comes from the background of conversational agents, like chatbots. For example, when a chatbot system processes a user query, the first step is to identify the user intent, and more specifically, is to classify each section of a sentence into broken down categories to understand the intention behind the input it has received.

Intent classification has been an ongoing topic of research and development in spoken language understanding. Previous works have been done on machine learning methods like Support Vector Machines (SVMs) and Conditional Random Fields (CRFs), n-gram language models, or combined approaches for intent determination. Knowledge based methods have also been explored.

In recent years, neural network based architectures and word embeddings have gained growing popularity for intent classification. Recurrent Neural Network Language Models (RNN LMs) have been proved to be effective for capturing temporal sentence semantics through a series of hidden units. Long Short-Term Memory (LSTM) neural networks were developed to further avoid the exploding and vanishing gradient problem of traditional RNNs by regulating the memory cells through activation computed by the gates. Deep RNNs and LSTMs based models with word embeddings have shown remarkable results on slot and intent detection, and there are models that jointly detects both. Convolutional Neural Network (CNN) based CRFs have also been applied and shown comparable results on joint detection of slots and intents.

As a matter of fact, intent classification with word embeddings as input has been a hot research topic in recent years, and deep learning approaches that are based on neural networks and word embeddings have been applied to research languages like English. Currently, thanks to the TensorFlow deep learning framework and its publicly available Word2Vec pre-trained word embeddings from Google, it is possible for academic and industry to invest efforts to study and build intent classifiers with higher performances. Other approaches and tools are also available.

However, intent classification has proven a big challenge for certain languages, such as Chinese. The challenge for Chinese intent classification stems from the fact that, unlike English where most words are made up of 26 phonologic alphabet letters, Chinese is logographic. Chinese words are composed of Chinese characters which are logograms that have independent meanings and the meanings vary in contexts, and a Chinese character is a more basic semantic unit that can be informative and its meaning does not vary too much in contexts.

Previous works on Chinese intent classification mainly adopt pre-trained word embedding vectors for learning, however, compared to other text classification tasks, in intent detection, the text contains more low-frequency domain-specific words like flight number or the name of a dish, which are out of vocabulary for many pre-trained word embeddings. Those less frequent words can share common characters with the more frequent words, like "步行街" ("walkway") and "步行" ("walk"), but with embedding learning tools like Word2Vec, the commonality of morphology between "步行街" and "步行" are lost since they are converted to different word ids. As such, Chinese word embeddings alone can be inadequate for representing words, and pre-trained embeddings can suffer from not aligning well with the task at hand.

SUMMARY OF THE INVENTION

Inventors of this present disclosure have realized that word embeddings only may not be good enough to represent a Chinese text input, as the existing Chinese word embeddings often utilize tokenization on the word level (a word may consist of multiple characters), rather than on the character level, whereas a Chinese character is a more intrinsic unit forming Chinese texts.

For example, when people read in Chinese, they would recognize words to understand the meaning of the text, but they would sometimes think about the characters that form a word to get a better understanding of the meaning of the word in contexts, this is especially helpful when unfamiliar words are presented, and this is where characters can come to help.

In addition, Chinese characters occur more frequently in fixed collocations, which limits the different contexts around a character, and this would make training Chinese character embeddings easier and more accurate, and hence features learned from Chinese characters are very informative.

For an analogy, the close counterpart to Chinese characters is English subwords, like suffixes and prefixes, and Chinese radicals (graphical components of a Chinese character) are the close counterpart to English characters. Therefore, incorporating character or character n-gram vectors into the conventional word vectors can help capture the morphology within a rare Chinese word to produce a better vector representation, because the character embeddings can be shared across rare and frequent words.

Inventors of this present disclosure have further realized that the meaning and relevancy of a word to the conversational intent are closely related to the sentence context it is in, but fixed pre-trained word and character embedding vectors are unable to adapt to contextual information.

To address the inadequacy of using static, pre-trained word embeddings alone for intent classification based on existing intent classification technologies, and to further leverage Chinese character information, the present disclosure proposes a method which can enhance Chinese intent classification by dynamically integrating character features into word embeddings with ensemble techniques.

More specifically, this approach is a low-effort and generic way to dynamically integrate character embedding based feature maps with word embedding based inputs, whose resulting word-character embeddings are stacked with a contextual information extraction module to further incorporate context information for predictions. An ensemble method is further employed to combine single models and obtain the final result.

In a first aspect, the present disclosure provides an intent classification method.

The intent classification method is specifically a computer-implemented method for determining an intent class of a sentence input in a language containing information-bearing characters. The method comprises the following two steps:

obtaining at least one set of word embeddings and character embeddings from the sentence input to thereby generate at least one set of integrated word-character embeddings, each corresponding to one of the at least one set of word embeddings and character embeddings; and determining an intent class corresponding to the sentence input based on the at least one set of integrated word-character embeddings.

In the method described above, the step of obtaining at least one set of word embeddings and character embeddings from the sentence input to thereby generate at least one set of integrated word-character embeddings can, according to some embodiments of the disclosure, comprise at least one round of the sub-steps of:

generating a character embedding based input and a word embedding based input from the sentence input;

generating character embedding vectors and word embedding vectors respectively from the character embedding based input and the word embedding based input;

extracting features from the character embedding vectors to thereby obtain a character feature map;

obtaining a pooled character feature map based on the character feature map; and integrating the pooled character feature map and the word embedding vectors to thereby obtain integrated word-character embedding vectors.

Herein, each of the at least round of the sub-steps corresponds to one of the at least one set of integrated word-character embeddings.

In the embodiments of the method described above, the sub-step of extracting features from the character embedding vectors to thereby obtain a character feature map can, according to some embodiments, be realized through a 2-D convolutional neural network (CNN)-based approach.

In addition, the sub-step of obtaining a pooled character feature map based on the character feature map can, according to some embodiments, be realized through a max-pooling operation.

Further in addition, in the sub-step of obtaining a pooled character feature map based on the character feature map, the pooled character feature map can, according to some embodiments, have a substantially same dimension as the word embedding vectors.

Furthermore, the sub-step of integrating the pooled character feature map and the word embedding vectors to thereby obtain integrated word-character embedding vectors can, according to some embodiments, be realized through a weighted average-based approach.

Furthermore, the sub-step of integrating the pooled character feature map and the word embedding vectors to thereby obtain integrated word-character embedding vectors can, according to some other embodiments, be realized through a concatenation-based approach.

In any of the embodiments of the method as described above, each of the at least one round of the sub-steps can, prior to the generating a character embedding based input and a word embedding based input from the sentence input, further comprise a sub-step of:

preprocessing the sentence input allowing tokenization thereof at a word level.

In the method disclosed herein, in the step of obtaining at least one set of word embeddings and character embeddings from the sentence input to thereby generate at least one set of integrated word-character embeddings, one or more of the at least one set of integrated word-character embeddings can, according to some embodiments, be updated during backpropagation.

In the method disclosed herein, a number of the at least one set of integrated word-character embeddings can be more than one, and accordingly, the step of determining an intent class corresponding to the sentence input based on the at least one set of integrated word-character embeddings can, according to some embodiments of the disclosure, comprises the following sub-steps:

obtaining a prediction result specifying a predicted intent class corresponding to the sentence input from a model containing each of the more than one set of integrated word-character embeddings; and ensembling the prediction result from the model containing the each of the more than one set of integrated word-character embeddings to thereby determine an intent class corresponding to the sentence input.

In the embodiments of the method described above, the sub-step of obtaining a prediction result specifying a predicted intent class corresponding to the sentence input from a model containing each of the more than one set of integrated word-character embeddings can, according to some embodiments, be realized through a long short-term memory (LSTM) neural network-based approach.

Further in the embodiments of the method described above, the sub-step of ensembling the prediction result from the model containing the each of the more than one set of integrated word-character embeddings to thereby determine an intent class corresponding to the sentence can, according to some embodiments, be realized through majority voting.

In the method disclosed herein, in the step of obtaining at least one set of word embeddings and character embeddings from the sentence input to thereby generate at least one set of integrated word-character embeddings, either or both of the word embeddings and character embeddings in one or more of the at least one set of word embeddings and character embeddings can, according to some embodiments, be randomly initialized.

In the method disclosed herein, in the step of obtaining at least one set of word embeddings and character embeddings from the sentence input to thereby generate at least one set of integrated word-character embeddings, either or both of the word embeddings and character embeddings in one or more of the at least one set of word embeddings and character embeddings can, according to some embodiments, be pre-trained.

In any of the embodiments of the method described above, the language can comprises at least one logographic language.

Herein, according to some embodiments, the at least one logographic language includes Chinese.

In a second aspect, the present disclosure further provides an intent classification system, which can be utilized for realizing the intent classification method as described above.

Specifically, the intent classification system includes at least one processor and a memory storing instructions that, when executed by the at least one processor, cause the system to:

obtain at least one set of word embeddings and character embeddings from a sentence input to thereby generate at least one set of integrated word-character embeddings, each corresponding to one of the at least one set of word embeddings and character embeddings; and determine an intent class corresponding to the sentence input based on the at least one set of integrated word-character embeddings.

According to some embodiments of the intent classification system, the instructions further cause the system to preprocess the sentence input allowing tokenization thereof at a word level.

In the intent classification system, the instructions causing the system to obtain at least one set of word embeddings and character embeddings from a sentence input to thereby generate at least one set of integrated word-character embeddings, each corresponding to one of the at least one set of word embeddings and character embeddings can, according to some embodiments, include: a first instruction causing the system to generate a character embedding based input and a word embedding based input from the sentence input, a second instruction causing the system to generate character embedding vectors and word embedding vectors respectively from the character embedding based input and the word embedding based input, a third instruction causing the system to extract features from the character embedding vectors to thereby obtain a character feature map, a fourth instruction causing the system to obtain a pooled character feature map based on the character feature map, and a fifth instruction causing the system to integrate the pooled character feature map and the word embedding vectors to thereby obtain integrated word-character embedding vectors.

In the embodiments of the intent classification system described above, the instructions stored in the memory can, according to some embodiments, further comprise a sixth instruction causing the system to obtain a prediction result specifying a predicted intent class corresponding to the sentence input from a model containing the integrated word-character embedding vectors.

In the embodiments of the intent classification system described above, the instructions stored in the memory can, according to some embodiments, additionally further comprise a seventh instruction causing the system to ensemble the prediction result from more than one model, each containing one set of integrated word-character embedding vectors to thereby determine an intent class corresponding to the sentence input.

The following are noted.

Throughout the disclosure, each of the terms "unit", "portion", "layer", "module" is referred to as a computer-implemented functional entity, which comprises at least one processor and a memory, wherein the memory is configured to store a software program (i.e. computer codes or executable instructions), and the at least one processor is configured to perform a calculation based on the software program stored in the memory to thereby perform a task carrying out the prescribed functionality. Furthermore, the at least one processor may include one or more controllers, general processors, specialized processors, coprocessors, etc., and the at least one processor can be arranged in a parallel processing structure and/or multiprocessing structure. In addition, each of the "unit", "portion", "layer", "module" may be a general computer having the software program, or can be a hardware computing device specifically designed for such a task. The computer and the hardware computing device can be locally arranged, or can be remotely arranged, such as on an intranet, an internet, or in a cloud.

Throughout the disclosure, each of a method, a step, a sub-step, a process and a feature, etc., may be implemented as part of an operating system or a specific application, component, program, object, module, or series of instructions referred to as "programs". For example, one or more programs may be used to execute specific processes described herein. The programs typically comprise one or more instructions in various memory and storage devices in a computer system that, when read and executed by at least one processor, cause the computer system to perform operations to execute the method, the step, the sub-step, the process, and the feature, etc. Each of a method, a step, a sub-step, a process and a feature, etc., may be implemented in software, firmware, hardware (e.g., an application specific integrated circuit), or any combination thereof.

Throughout the disclosure, unless indicated otherwise, the terms "class" and "category" shall be interpreted as interchangeable.

BRIEF DESCRIPTION OF DRAWINGS

To more clearly illustrate some of the embodiments disclosed herein, the following is a brief description of drawings. The drawings in the following descriptions are only illustrative of some embodiments. For those of ordinary skill in the art, other drawings of other embodiments can become apparent based on these drawings.

DETAILED DESCRIPTION OF DRAWINGS

In the following, with reference to the above mentioned drawings of various embodiments disclosed herein, the technical solutions of the various embodiments of the disclosure will be described in a clear and fully understandable way. It is noted that the described embodiments are merely a portion, but not all, of the embodiments of the disclosure. Based on the described embodiments of the disclosure, those ordinarily skilled in the art can obtain other embodiment(s), which shall come within the scope sought for protection by the disclosure.

In a first aspect, the present disclosure provides an intent classification unit, which is configured to receive a sentence input, and then to compute and output a prediction result specifying a pre-determined intent category/class associated with the sentence input.

Figure 1:
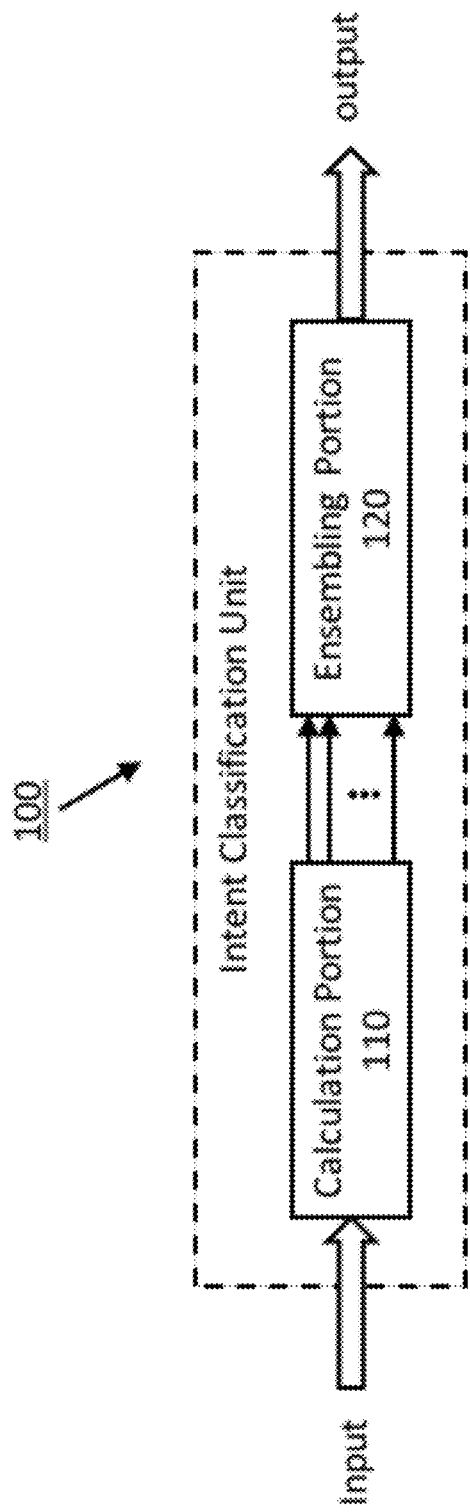
FIG. 1 is a block diagram of an intent classification unit according to some embodiments of the disclosure.

FIG. 1 illustrates a block diagram of an intent classification unit according to some embodiments of the disclosure. As shown in FIG. 1, the intent classification unit 100 includes a calculation portion 110 and an ensembling portion 120. The calculation portion 110 is configured, upon receiving the sentence input, to obtain a plurality of prediction results, each based on a different model. The ensembling portion 120 is configured, based on the plurality of prediction results obtained from the calculation portion 110, to produce the final prediction result based on a pre-determined rule (i.e. model ensemble scheme).

Figure 2:
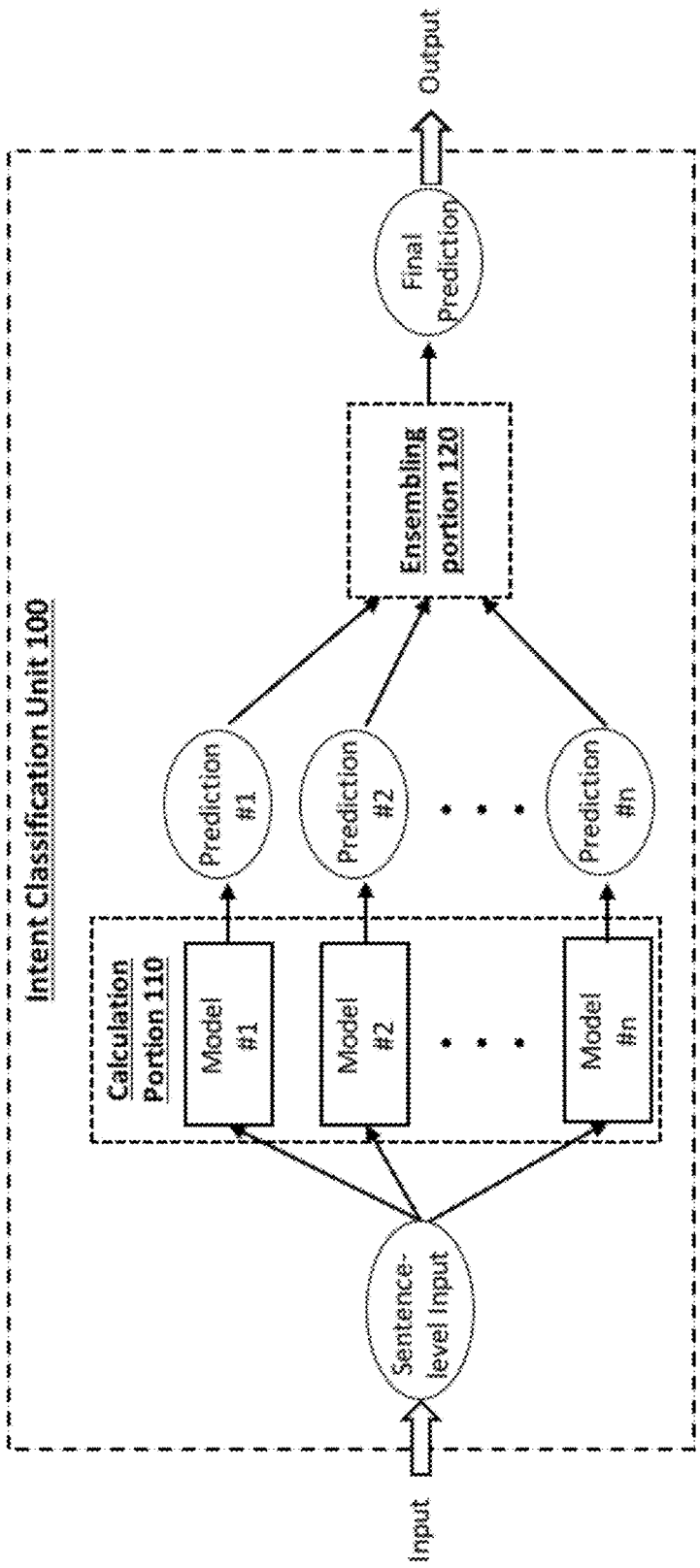
FIG. 2 illustrates a working principle of the intent classification unit as shown in FIG. 1.

The working principle of the intent classification unit as shown in FIG. 1 is further specifically illustrated in FIG. 2. As shown in FIG. 2, the calculation portion 110 substantially comprises a plurality of models (as illustrated by #1, #2, . . . , # n in the figure, where n≥2). Once the sentence input is received by the intent classification unit 100, the sentence input is fed into each of the plurality of models (i.e. Model # i, where i is an integer in a range between 1 and n) in the calculation portion 110 for the calculation of a prediction result corresponding to the each of the plurality of models (i.e. prediction # i corresponding to Model # i).

The ensembling portion 120 is further configured, upon receiving each prediction result corresponding to each of the plurality of models (i.e. prediction # i, where i is each integer in a range between 1 and n), to produce a final prediction result based on a pre-determined rule. The final prediction result is finally outputted by the intent classification unit 100.

The intent classification unit 100 disclosed herein can be specifically employed to perform a semantic analysis of Chinese. It is noted, however, that it is not limited to Chinese, and it can also be applicable to other languages as well, as long as each of these other languages is also character-based (i.e. logographic), and the characters also bear information that can help the understanding of words containing the characters.

Herein, according to some preferred embodiments, each of the plurality of models in the calculation portion 110 can have substantially same architecture which is substantially a neural network based model.

Figure 3:
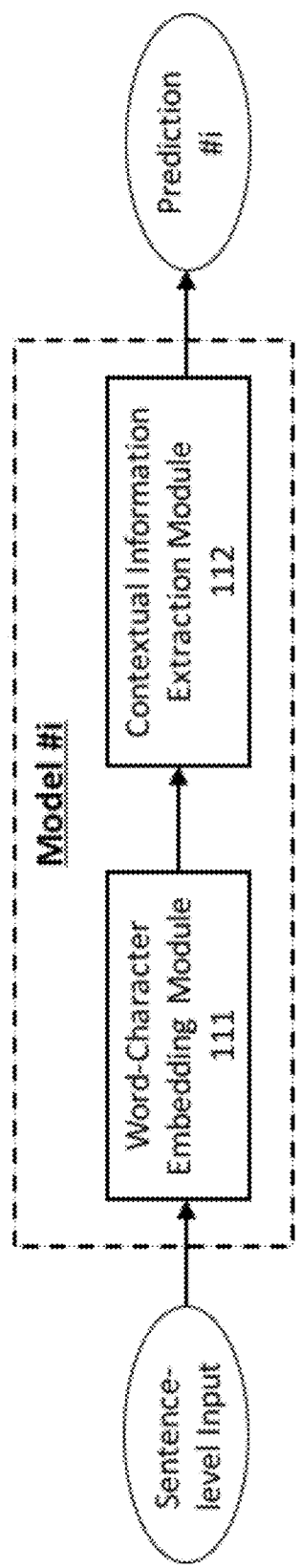
FIG. 3 is a block diagram of an architecture of each of the plurality of models in the calculation portion of the intent classification unit according to some embodiments of the disclosure.

As specifically shown by a block diagram of the architecture of each of the plurality of models (i.e. Model # i) illustrated in FIG. 3, each model includes a word-character embedding module 111 and a contextual information extraction module 112. The word-character embedding module 111 is configured, based on the sentence-level input, to generate integrated word and character embedding vectors. The contextual information extraction module 112 is further configured, based on the integrated word and character embedding vectors generated by the word-character embedding module 111, to generate context-level features corresponding to the sentence-level input, and is further configured to predict an intent class corresponding to the sentence-level input.

Figure 4:
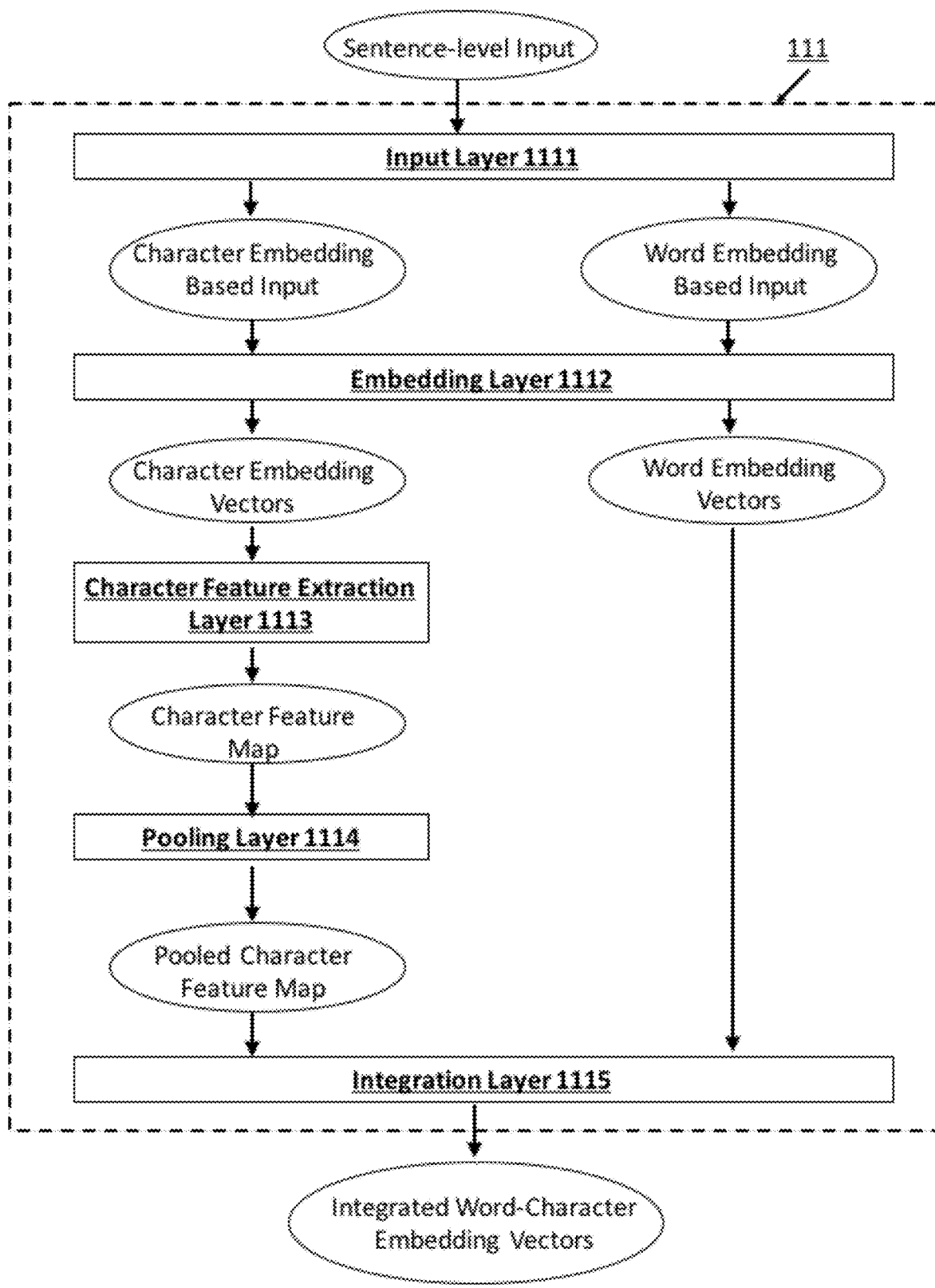
FIG. 4 illustrates a block diagram and a working flow of a word-character embedding module in the calculation portion of the intent classification unit according to some embodiments of the disclosure.

FIG. 4 illustrates one specific embodiments of a word-character embedding module 111, which is substantially based on a convolutional neural network (CNN). As shown in the figure, the word-character embedding module 111 specifically includes an input layer 1111, an embedding layer 1112, a character feature extraction layer 1113, a pooling layer 1114, and an integration layer 1115.

The input layer 1111 is configured to separately generate a character embedding based input and a word embedding based input based on the sentence-level input received. The embedding layer 1112 is then configured, based on the character embedding based input and the word embedding based input generated from the input layer 1111, to generate character embedding vectors and word embedding vectors respectively.

The character feature extraction layer 1113 is configured to extract features from the character embedding vectors generated from the embedding layer 1112 and then to generate a character feature map. Then based on the character feature map generated from the character feature extraction layer 1113, the pooling layer 1114 is configured to obtain a pooled character feature map.

The integration layer 1115 is ultimately configured, based on the pooled character feature map obtained from the pooling layer 1114 and the word embedding vectors generated from the embedding layer 1112, to generate integrated word-character embedding vectors.

It is noted that in some cases a sentence input is not yet tokenized into words, and thus according to some embodiments of the disclosure, the intent classification unit further comprises a preprocessing layer. The preprocessing layer is configured, based on a pre-stored tokenization tool, to process the sentence input to allow the sentence input to be tokenized into words. Specifically, through the processing by the preprocessing layer, the sentence and words in the sentence can be padded to fixed maximum lengths in order to do mini-batch training. Similarly, for run-time prediction, either padding or truncation to the same fixed lengths are done as a sub-step of preprocessing.

Provided in the following is one specific embodiment of a word-character embedding module 111 illustrated in FIG. 4.

Specifically, the input layer 1111 creates placeholders for the sentence-level input in both word and character representations. For a sentence of M words where each word consists of N characters (padding or truncation applied), a word embedding based input $w \in \mathbb{R}^{M \times d_w}$ is represented as a sequence of M words, where the value of a word will be filled in by its $d_w$-dimensional word embedding vector. A character embedding based input $e \in \mathbb{R}^{M \times N \times d_c}$ is a sequence of character sequences. It is a depicted as a sequence of M words, where each word is decomposed into a sequence of N characters, and the value of a character will be given by its $d_c$-dimensional character embedding vector.

For the simplicity of notations and from the mini-batch training perspective, for a batch of S sentences, the word- and character embedding based inputs will be in the form of 3-D and 4-D tensors, i.e., $W \in \mathbb{R}^{S \times M \times d_w}$, and $C \in \mathbb{R}^{S \times M \times N \times d_c}$.

Correspondingly, the embedding layer 1112 takes outputs (i.e. character embedding based input c and the word embedding based input w) from the input layer 1111, performs word and character embeddings look-ups, and fills the placeholders in with the corresponding character embedding vectors and word embedding vectors.

Given that the purpose of the character feature extraction layer 1112 is to uncover the information embedded in the characters, and that 2-D convolutional neural networks (CNN) have relatively good performances at extracting temporal and spatial information within a sequence, the character feature extraction layer 1112 can preferably be a 2-D convolutional layer.

In accordance, according to this specific embodiment, the character feature extraction layer 1113 is a 2-D convolutional layer which specifically takes the character output C from the embedding layer, applies a 4-D filter $F \in \mathbb{R}^{1 \times V \times d_c / d_w}$ to compute 2-D convolution operation on a window of V characters, where $d_c$ features in the second dimension, $d_w$ features in the third dimension, and V features a number of grams in the character features (e.g. V can be fixed to 2 to create bi-gram character features).

For instance, an output $o_{s,i,j,k}$ is obtained by the following equation:

$$o_{s,i,j,k} = f(b + \Sigma_{s, i+d_j, j+d_j, q} C_{s, i+d_j, j+d_j, q} \cdot F_{d_j, d_j, q, k}) \qquad (1)$$

where s, i, j, k are in the ranges of [1, S], [1, M], [1, N], and [1, $d_w$] respectively, $b \in \mathbb{R}^{d_w}$ is a bias, f is a non-linear activation function applied to the convolution result plus bias.

The resulting character feature map is a 4-D tensor in $\mathbb{R}^{S \times M \times N \times d_w}$ as follows:

$$O=[o_{1,1,1,1}, \ldots, o_{S,M,N,d_w}] \quad (2)$$

The character feature map can be interpreted as a batch of sentences in its character-level feature representations, where each word is represented by N $d_w$-dimensional character features.

The purpose of the pooling layer 1114 is to reduce the N features to form a single most informative feature within each word, and as such, optionally a max-pooling operator with a sliding window of [1, 1, N, 1] can be applied on O. For example, a pooling output $p_{s,i,1,k}$ is computed by:

$$p_{s,i,1,k} = \max_{1 \le j \le N} o_{s,i,j,k} \quad (3)$$

Therefore, the character feature map is downsampled to size $\mathbb{R}^{S \times M \times 1 \times d_w}$.

$$P=[p_{1,1,1,1}, \ldots, p_{S,M,1,d_w}] \quad (4)$$

After proper reshaping, the shape of P should be $\mathbb{R}^{S \times M \times d_w}$, which is in the same dimensions of word embedding based input W.

Correspondingly, the integration layer 1115 enforces the integration of the pooled character feature map generated from the pooling layer 1114 with the word embedding vectors obtained from the embedding layer 1112 to thereby obtain integrated word-character embedding vectors, which are purported to bring the most out of both word and characters.

According to some embodiments of the disclosure, the integration of the pooled character feature map with the word embedding vectors is realized by concatenation.

Yet considering the computation time, according to some other embodiments of the disclosure, the integration of the pooled character feature map with the word embedding vectors can be realized by averaging the two representations elementwisely. Accordingly, the resulting integrated word-character embedding vectors in the dimensions of $\mathbb{R}^{S \times M \times d_w}$ can be obtained by the following equation:

$$I=(W+P)/2.0 \quad (5)$$

As such, by means of the word-character embedding module 111 described above, features at the word and character levels in a sentence input, which are represented as integrated word-character vectors, are therefore extracted.

These features, however, cannot be utilized best without considering the dependency of words to their contexts. Contextual information like past neighboring words are still important to reveal the actual meaning of a word in a sentence.

Thus in order to further leverage the contextual information, the contextual information extraction module 112 is further employed to predict an intent class corresponding to the sentence-level input based on the integrated word and character embedding vectors generated by the word-character embedding module 111.

According to some embodiments of the disclosure, the contextual information extraction module 112 comprises a long short-term memory (LSTM) based multiclass classification model.

Specifically, an LSTM cell is utilized to remember past temporal information, and the integrated word-character embedding vectors I described above is used as basic input to the LSTM cell for obtaining context level features. A recurrent LSTM layer is configured to have 512 hidden units. The output is stacked with a linear layer that computes an output probability distribution over the pre-determined intent classes. The argmax of the distribution is taken and returned as a single model prediction.

The LSTM works as follows. An LSTM cell is accomplished by modifying a basic recurrent neural network (RNN) cell, which computes the output h at each timestep using both the current timestep input $I_t$ and the previous output $h_{t-1}$ via $$h_t = \sigma(W_h \cdot [h_{t-1}, I_t] + b_h) \quad (6)$$

The LSTM cell augments the RNN cell by implementing a forget gate and an input gate that control what past information is kept or discarded.

$$f_t = \sigma(W_f \cdot [h_{t-1}, I_t] + b_f) \quad (7)$$

$$i_t = \sigma(W_i \cdot [h_{t-1}, I_t] + b_i) \quad (8)$$

This allows the cell to have a state vector $$C_t = f_t \circ C^{t-1} + i_t \circ \tan h(W_C \cdot [h_{t-1}, I_t] + b_C) \quad (9)$$

that represents the memory of the network. The output $h_t$ is then calculated from the cell state C and an output gate $o_t$, where $$o_t = \sigma(W_o \cdot [h_{t-1}, I_t] + b_o) \quad (10)$$

and $$h_t = o_t \circ \tan h(C_t) \quad (11)$$

Furthermore, to enable context-adaptive embeddings, the word and character embeddings (i.e. the integrated word-character embedding vectors) can optionally be updated during backpropagation.

In order to account for the variances in the prediction result obtained from one single model in the word-character embedding module 111, according to some embodiments of the disclosure, more than one model can be employed to obtain more than one prediction result corresponding respectively to the more than one model. In accordance, an ensembling portion 120 can be employed to produce a final prediction result based on the more than one prediction result. A pre-determined rule (i.e. model ensemble scheme) can be applied to this purpose.

According to some embodiments, the final prediction is selected by majority voting on each of the more than one prediction result. Other rules, however, can alternatively be applied according to other embodiments of the disclosure.

In a second aspect, the present disclosure further provides a method for determining an intent class of a sentence in a language (i.e. an intent classification method). Herein the language can be a character-based language (i.e. logographic language, such as Chinese), where the characters thereof bear information that can help the understanding of words containing the characters.

Figure 5:
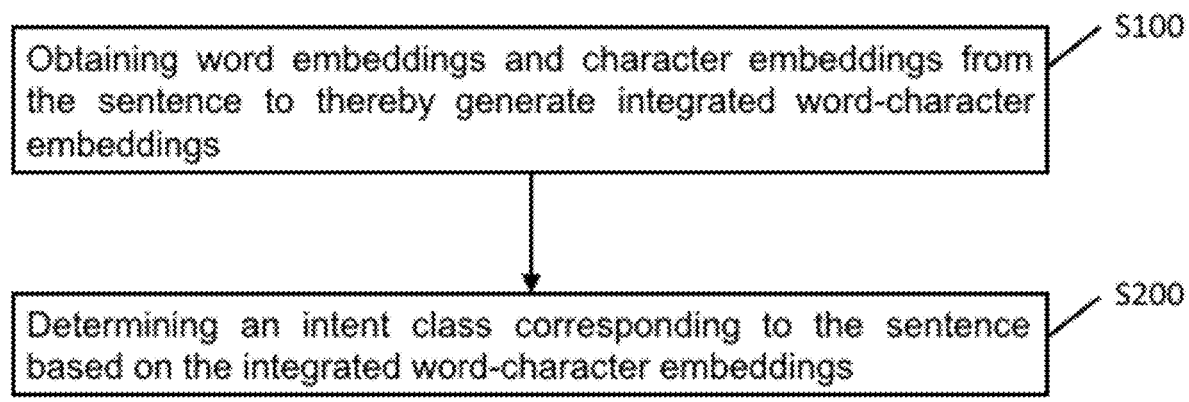
FIG. 5 is a flow chart of an intent classification method according to some embodiments of the disclosure.

FIG. 5 is a flow chart of the intent classification method according to some embodiments of the disclosure. As illustrated, the intent classification method includes the following steps:

S100: obtaining word embeddings and character embeddings from the sentence to thereby generate integrated word-character embeddings; and S200: determining an intent class corresponding to the sentence based on the integrated word-character embeddings.

As such, compared with existing intent classification methods performing semantic analysis of a character-based language such as Chinese which merely base their analysis on word embeddings, the intent classification method disclosed herein additionally leverages character embeddings for the prediction of intent classes (categories). Such a feature allows the intent classification method disclosed herein to be able to realize a relatively higher prediction accuracy.

Figure 6:
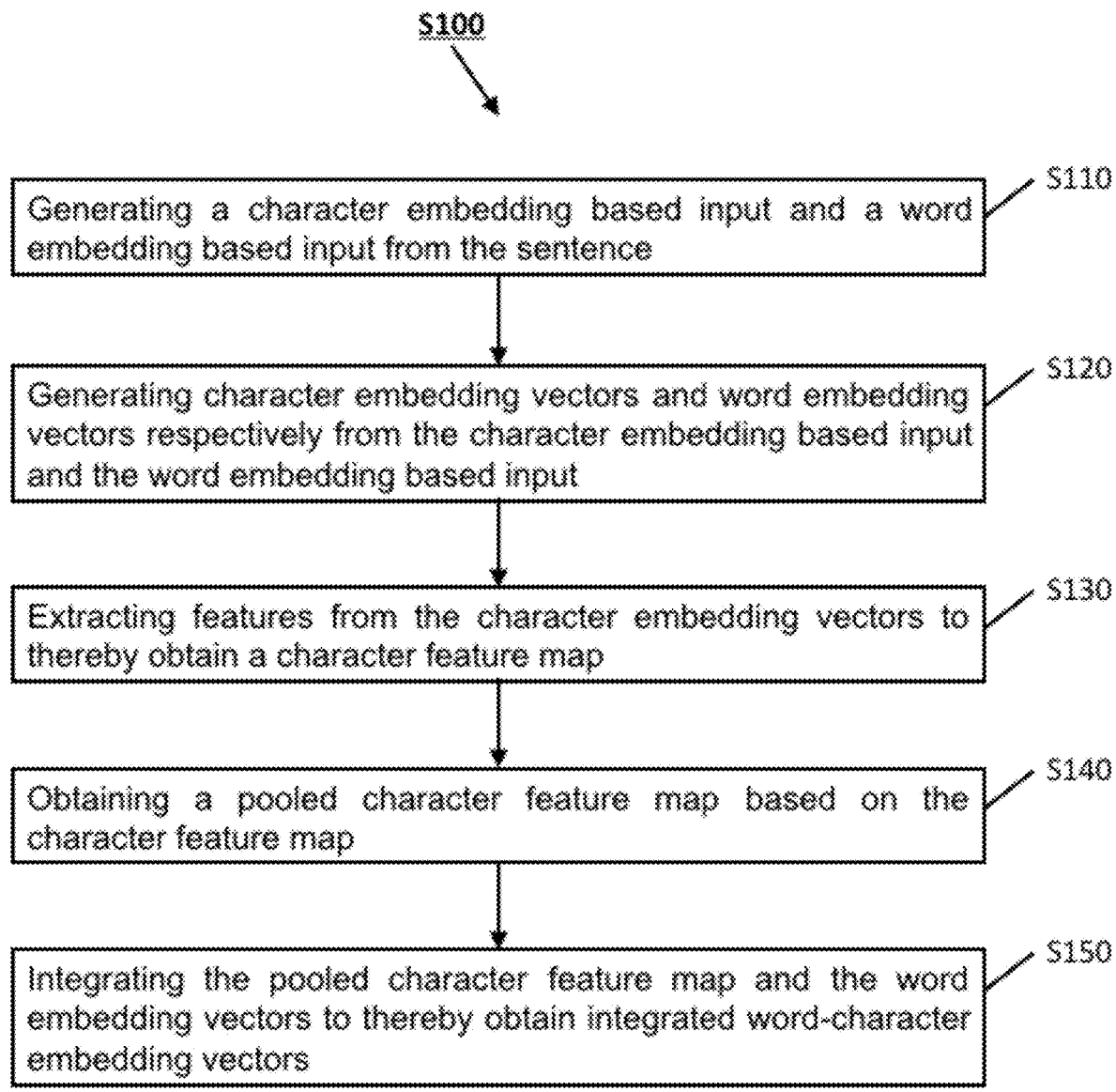
FIG. 6 is a flow chart of the sub-steps implemented in the step S100 of the intent classification method shown in FIG. 5 according to some embodiments of the disclosure.

According to some embodiments of the intent classification method, the step S100 specifically comprises the following sub-steps, as illustrated in FIG. 6:

S110: generating a character embedding based input and a word embedding based input from the sentence;

S120: generating character embedding vectors and word embedding vectors respectively from the character embedding based input and the word embedding based input;

S130: extracting features from the character embedding vectors to thereby obtain a character feature map;

S140: obtaining a pooled character feature map based on the character feature map; and S150: integrating the pooled character feature map and the word embedding vectors to thereby obtain integrated word-character embedding vectors.

Herein through the sub-steps S110-S150, the sentence is transformed into character embedding vectors and word embedding vectors, which are subsequently integrated to obtain the integrated word-character embedding vectors. In other words, the word embeddings, the character embeddings, and the integrated word-character embeddings as described in the step S100 are transformed in format of vectors, thereby allowing a neural network based approach to be employed.

It is noted that in order to ready the sentence to allow the generation of a character embedding based input and a word embedding based input therefrom in the sub-step S110, according to some embodiments of the method, the step S100 further comprises a preprocessing sub-step:

S109: preprocessing the sentence allowing tokenization thereof at a word level.

The sub-step S109 can be realized through a tokenization layer, which can employ a pre-stored tokenization tool such that the sentence and words in the sentence can be padded to fixed maximum lengths in order to do mini-batch training. Similarly, for run-time prediction, either padding or truncation to the same fixed lengths are done as a sub-step of preprocessing.

In one illustrating example in this present disclosure, in order to allow the preprocessing of the sentence in Chinese in the sub-step S109, the Jieba Chinese tokenizer (https://github.com/fxsjy/jieba) can be employed as the pre-stored tokenization tool. Other tokenization tool can also be employed.

It is noted that each of the sub-steps S110-S150 can be respectively performed through the input layer 1111, the embedding layer 1112, the character feature extraction layer 1113, the pooling layer 1114, and the integration layer 1115 in the word-character embedding module 111 of the calculation portion 110 in the intent classification unit 100 as described above and illustrated in FIG. 4, but can be performed through functional structures of an architecture according to other embodiments of the disclosure.

Specifically, according to some embodiments of the method, the sub-step S130 of extracting features from the character embedding vectors to thereby obtain a character feature map is realized through a 2-D convolutional neural network (CNN)-based approach, performed in a character feature extraction layer 1113. Thus in accordance, the character feature extraction layer 1113 is substantially a 2-D convolutional layer.

The 2-D CNN-based approach, if employed for the extraction of character features from the character embedding vectors, has an advantage of being able to realize a dynamic learning of character-level n-gram feature maps. The detailed description of the 2-D CNN-based approach employed in the character feature extraction layer 1113 has been provided above and is skipped herein.

It is noted, however, that the application of a 2-D CNN-based approach for the extraction of character features from the character embedding vectors in the sub-step S130 described above shall be interpreted as not limiting, and other neural network-based approaches are also possible.

According to some embodiments of the method, the sub-step S140 of obtaining a pooled character feature map based on the character feature map obtained in the sub-step s130 can be performed through a max pooling operation, and thus in accordance, the pooling layer 1114 is substantially a max-pooling layer. Operations other than the max pooling scheme as described above are also possible to realize the sub-step S140.

The sub-step S150 of integrating the pooled character feature map and the word embedding vectors to thereby obtain integrated word-character embedding vectors can be realized in different ways.

According to some embodiments of the method, the integration can be performed through an averaging-based approach, where the integrated word-character embedding vectors are obtained by merely averaging the two representations (i.e. the pooled character feature map and the word embedding vectors) elementwisely. This averaging-based approach has an advantage of having relatively small computation time. It is noted that in this substantially weighted average-based approach, the two representations (i.e. the pooled character feature map and the word embedding vectors) can optionally be given an equal weight, but can also optionally be given a different weight in the integration.

According to some other embodiments of the method, the integration can be performed through an concatenation-based approach, where the integrated word-character embedding vectors are obtained by concatenating the pooled character feature map and the word embedding vectors.

After generation of the integrated word-character embeddings in the step S100, the step S200 of determining an intent class corresponding to the sentence based on the integrated word-character embeddings can subsequently be performed. Preferably, given that the contextual information like past neighboring words are important to reveal the actual meaning of a word in a sentence, the determination of the intent class can be realized with further consideration and leverage of contextual information.

According to some embodiments, the step S200 of determining an intent class corresponding to the sentence based on the integrated word-character embeddings can be performed through a long short-term memory (LSTM) neural network based approach.

Specifically, according to some embodiments of the disclosure, a contextual information extraction module (with reference to the contextual information extraction module 112 described above and illustrated in FIG. 3) is employed in the step S200, which can comprise a long short-term memory (LSTM) based multiclass classification model. The integrated word-character embeddings obtained in the step S100 can be stacked with a long short-term memory (LSTM) based contextual information extraction module to produce a final class probability distribution.

According to some specific embodiments, an LSTM cell is utilized to remember past temporal information, and the integrated word-character embedding vectors are taken as basic input to the LSTM cell for obtaining context level features. A recurrent LSTM layer can have 512 hidden units, and the output is stacked with a linear layer that computes an output probability distribution over the pre-determined intent classes, with the argmax of the distribution returned as the final model prediction specifying the intent class corresponding to the sentence input.

It is noted that in the aforementioned embodiments of the intent classification method which substantially include the steps of S100 and S200 as described above, only one single model is implicated.

Yet in order to account for the variances in the prediction result obtained from one single model, according to some other embodiments of the disclosure, more than one model can be employed in the intent classification method. Thereby more than one prediction result can be obtained from the more than one model. Further accordingly, an extra ensembling step can be further carried out, which produce a final prediction result specifying the intent class for the sentence input based on the more than one prediction result corresponding to the more than one model.

Figure 7:
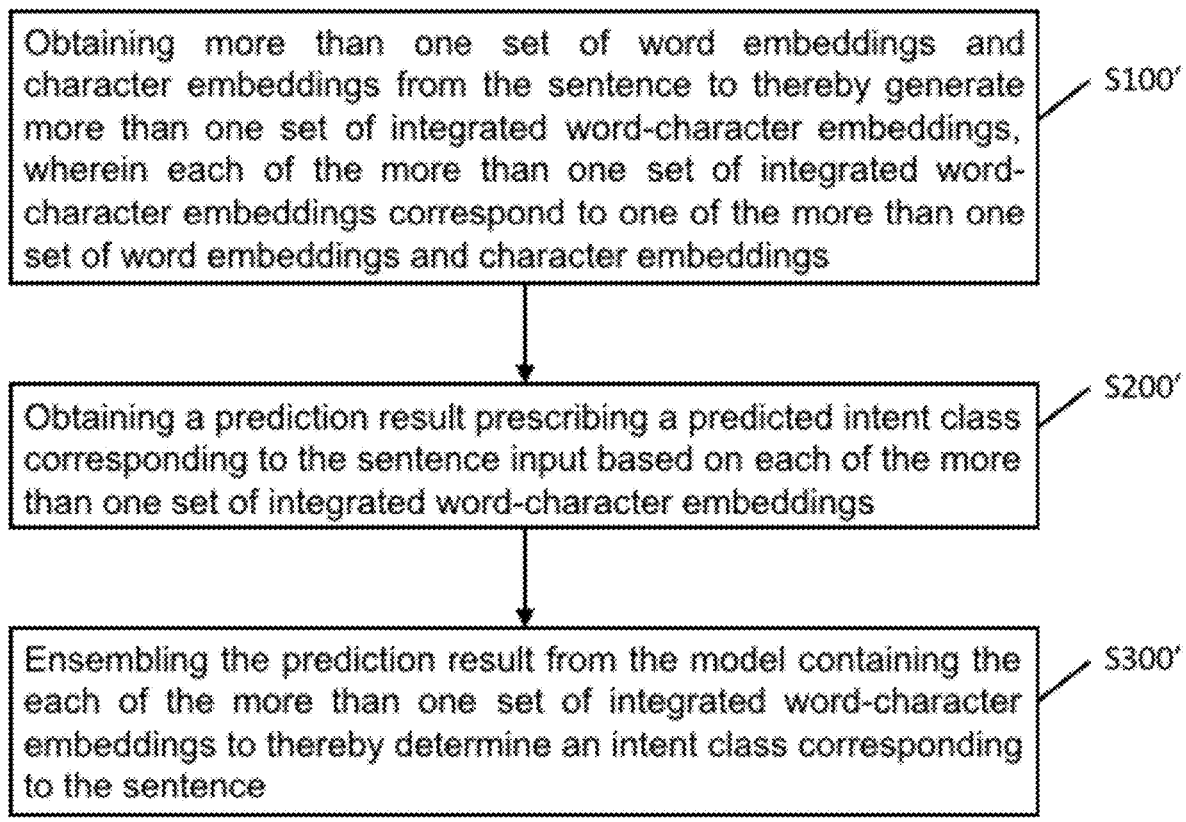
FIG. 7 is a flow chart of an intent classification method according to some other embodiments of the disclosure.

As such, as illustrated in FIG. 7, the intent classification method according to these other embodiments of the disclosure comprises:

S100': obtaining more than one set of word embeddings and character embeddings from the sentence to thereby generate more than one set of integrated word-character embeddings, wherein each of the more than one set of integrated word-character embeddings correspond to one of the more than one set of word embeddings and character embeddings;

S200': obtaining a prediction result specifying a predicted intent class corresponding to the sentence input from a model containing each of the more than one set of integrated word-character embeddings; and S300': ensembling the prediction result from the model containing the each of the more than one set of integrated word-character embeddings to thereby determine an intent class corresponding to the sentence.

Herein similar to the embodiments of the method illustrated in FIG. 5, each of the more than one set of word embeddings and character embeddings, and each of the more than one set of integrated word-character embeddings can be in format of vectors, and similarly, in the step S100' described herein, the obtaining of each of the more than one set of word embeddings and character embeddings from the sentence to thereby generate integrated word-character embeddings therefrom can have a substantially same set of sub-steps as in the above embodiments of the method illustrated in FIG. 6 (i.e. sub-steps S110-S150).

Correspondingly, the step S100' can also be performed through the input layer 1111, the embedding layer 1112, the character feature extraction layer 1113, the pooling layer 1114, and the integration layer 1115 in the word-character embedding module 111 of the calculation portion 110 in the intent classification unit 100 as described above and illustrated in FIG. 4.

It is noted that the obtaining of each of the more than one set of word embeddings and character embeddings from the sentence and the subsequent generation of the more than one set of integrated word-character embeddings can have different manners of running in a computer having an architecture containing each of the input layer 1111, the embedding layer 1112, the character feature extraction layer 1113, the pooling layer 1114, and the integration layer 1115 in the word-character embedding module 111.

More specifically, the obtaining of each of the more than one set of word embedding vectors and character embedding vectors and/or the generation of each of the more than one set of integrated word-character embedding vectors can be carried out one after another, or alternatively can be carried out simultaneously.

Further similarly, these above embodiments of the intent classification method illustrated in FIG. 7 can also be based on a neural network (e.g. 2-D CNN), implicating a max-pooling operation, and/or implicating averaging-based approach, whose descriptions have been provided in the above section of the specification and will be skipped herein.

In the embodiments of the method described herein and illustrated in FIG. 7, the step S200' of obtaining a prediction result specifying a predicted intent class corresponding to the sentence input from a model containing each of the more than one set of integrated word-character embeddings can also be performed through a long short-term memory (LSTM) neural network based approach, in a manner substantially same to the embodiments of the method illustrated in FIG. 5. The description is skipped herein.

After the step S200', because more than one prediction result are generated from more than one model, each containing one of the more than one set of integrated word-character embeddings, an additional ensembling step (i.e. step S300') needs to be performed to obtain a final prediction result to thereby determine an intent class corresponding to the sentence.

Optionally an ensembling portion 120 can be employed to produce the final prediction result based on the more than one prediction result. A pre-determined rule (i.e. model ensemble scheme) can be applied to this purpose.

According to some embodiments of the method, the final prediction can be selected by majority voting from the more than one prediction result. Other rules, however, can alternatively be applied according to other embodiments of the disclosure.

In addition, a preprocessing sub-step which is substantially same to the sub-step S109 as described above may also be included in the step S100' in the above mentioned intent classification method.

In the following, with reference to FIG. 8A and FIG. 8B, one specific embodiment of an intent classification unit will be described in detail. In this specific example, a Chinese sentence "民间小炒肉的做法" (a method for cooking a dish named "popular stir-fried meat") 510 is fed into the intent classification unit as a Chinese sentence input.

First, upon receiving the Chinese sentence input 810, a character-word embedding module 111a obtains a character embedding based input 821 and a word embedding based input 822 from the Chinese sentence input 810.

Further under the action of the character-word embedding module 111a, the word embedding based input 822 is further transformed into word embedding vectors 832, and the character embedding based input 821 is also transformed into character embedding vectors 831.

Figure 8A:
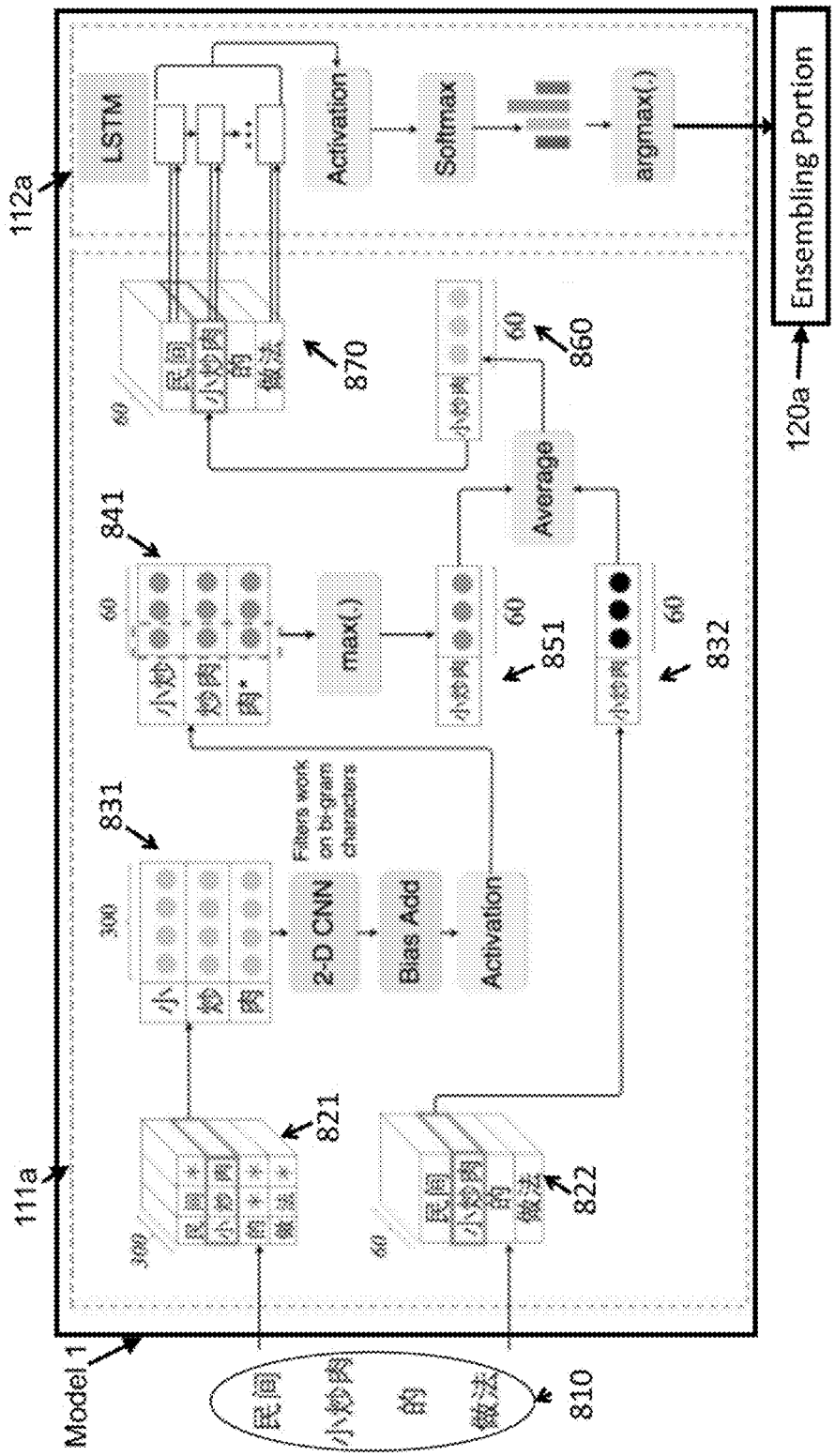
FIG. 8A and FIG. 8B together illustrate an overall architecture of an intent classification unit and a working flow thereof according to one specific embodiment of the present disclosure.

Next, the character embedding vectors 831 undergo extraction (as shown by the blocks "2-D CNN", "Bias Add"

and "Activation" in FIG. 8A) for character features under a 2-D CNN based approach with a filter on bi-gram characters applied, to thereby obtain a character feature map 841, which is then reduced into a pooled character feature map 851 specifically through a max-pooling operation (as shown by the "max(.)" in FIG. 8A).

The pooled character feature map 851 is then integrated with the word embedding vectors 832 to thereby obtain integrated word-character embedding vectors 860 and 870. Herein the integration is performed specifically via an averaging approach (as shown by the block "Average" in FIG. 8A). In the figure, it is noted that 860 represents a component word-character vector representing a phrase or a sequence of characters (illustrated by the "小炒肉" in the figure) in the whole Chinese sentence input. The multiple component word-character vectors 860 can be then integrated to thereby form the integrated word-character embedding vectors 870, which substantially represent the whole Chinese sentence input.

The integrated word-character embedding vectors 870 are then outputted from the character-word embedding module 111a to a contextual information extraction module 112a for the determination of an intent class corresponding to the Chinese sentence input through a long short-term memory (LSTM) neural network based multiclass classification model.

Figure 8B:
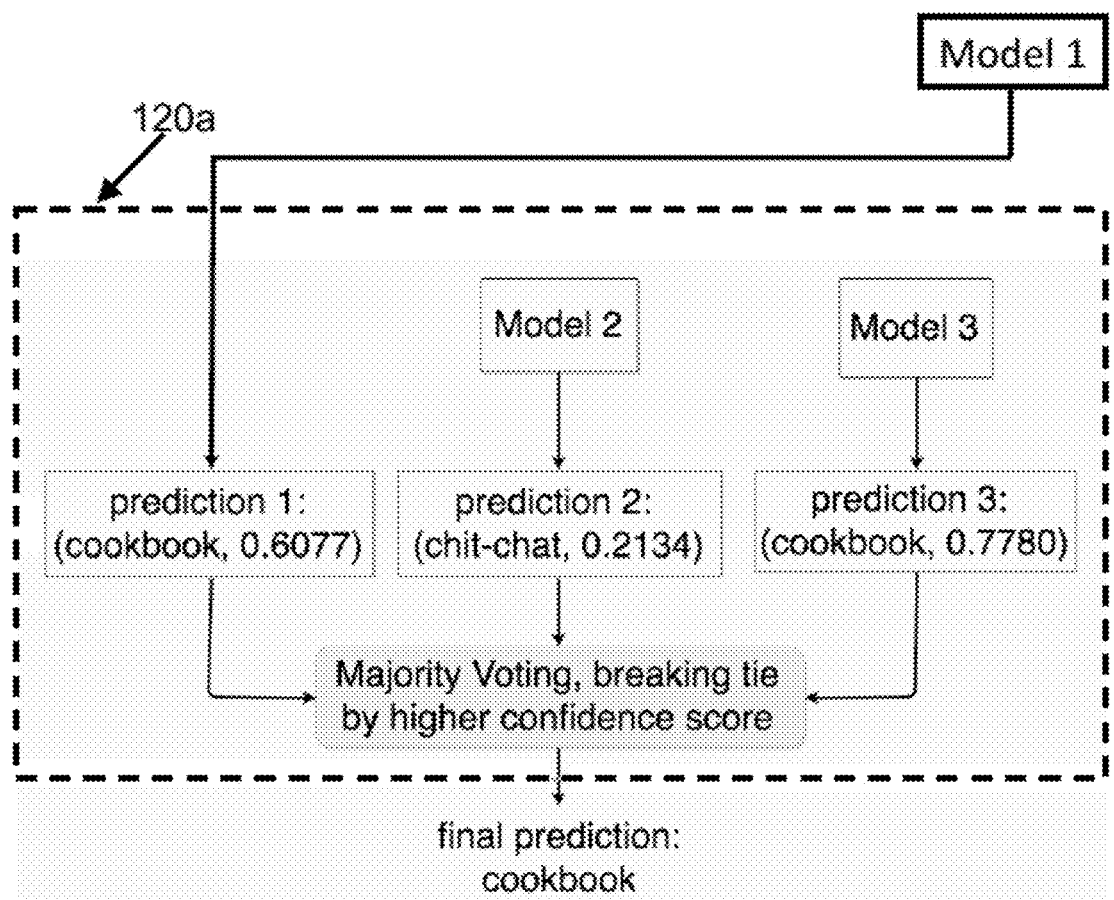

Under the contextual information extraction module 112a, an argmax of the distribution (as shown by the "argmax(.)" in FIG. 8A) is taken and returned as a single model prediction (as shown by the "Prediction 1: cookbook, 0.6077" for "Model 1" in FIG. 8B), which is further fed into an ensembling portion 120a.

Prediction results from a total of three separate models (i.e. Model 1, Model 2, and Model 3) are fed into the ensembling portion 120a, and through majority voting, the intent class of the Chinese sentence input is ultimately determined to be "cookbook".

Specifically, the following provides the experimental setup for the illustrating example shown in FIG. 8A and FIG. 8B.

The SMP Dataset:

The SMP2017ECDT (SMP) dataset consists of Chinese user queries recorded from human-computer dialogues and transcribed to text (Zhang et al., 2017). It covers 31 intent classes including Chit-chat, Weather, Flights, Cookbook and etc. A sample query is in the format of 你好请问一下明天广州的天气如何 (Hello I want to know the weather in Guangzhou tomorrow), which is labeled as the Weather intent. The dataset is split into a train set of 3,069 samples, and a test set of 667 samples. The SMP dataset is a little imbalanced as the Chit-chat category contains around 20% of all data, whereas the rest 30 categories/classes are distributed more evenly.

Word and Character Embeddings:

It is hypothesized that dynamically integrating character features into input word features can enhance performance, compared to using word features alone. As such, random initialization for character embeddings in the experiments is used, and both randomly initialized and open-domain pre-trained word embeddings (Pre-trained word embeddings are trained on a 1G Chinese Wikipedia corpus, http://pan.baidu.com/s/1boPm2x5) are used for experiment and control. The character embedding vectors are initialized to be 300-dimensional with component value ranging from 0 to 1, and the word embedding vectors are initialized in the same range with a dimension of 60 to be consistent with the pre-trained word embeddings. Both randomly initialized and pre-trained embeddings are updated during every backpropagation in training.

Baseline Models:

The hypothesis is that the proposed word-character based model improves intent classification accuracy compared to word-alone model, in this case the experiment is done on the hybrid Word-Character embedding based neural model and the control group is done on word embedding based LSTM, where details are presented in the previous section.

Combining the hypotheses of models and embeddings, four sets of experiment settings are developed, including two experiments on word-alone LSTMs, one using randomly initialized word embeddings and the other with pre-trained word embeddings, and experiments on the proposed model are also divided into two parts, one utilizes random initialization for both embeddings, the other uses pre-trained word embeddings and randomly initialized character embeddings to test out if even for pre-trained word embeddings, the proposed scheme of integrating character features can still help boost up performances.

The experiments on using pre-trained character embeddings are omitted, because the focus is intended to lay on the effectiveness of the low-effort way of generating and integrating character features dynamically, without relying on large external corpus and the need of pre-training embeddings.

For ensembles, the ensemble of the proposed models to ensemble of baseline LSTMs are compared. A comparison on the best model and the state-of-the-arts is also provided in the following.

Preprocessing:

To start with, since the data is not tokenized into words, the first step is to tokenize the sentences. The Jieba Chinese tokenizer (https://github.com/fxsjy/jieba) is applied in this work. Sentences and words in sentences are then padded to fixed maximum lengths in order to do mini-batch training. Similarly, for run-time prediction, either padding or truncation to the same fixed lengths are done as a step of preprocessing.

Hyper-Parameter Tuning:

For model selection, hyper-parameter tunings are performed by grid search. The component single models in the ensemble share the same set of hyper-parameters.

Evaluation Metrics:

For this multiclass intent classification problem, model performance is measured by unweighted F1 scores, implemented with the Python scikit-learn package (Pedregosa et al., 2011).

Results and Discussion:

The results of the proposed Word-Char (CNN based) LSTM models and baseline LSTMs are shown in Table 1. Ensemble results are given in Table 2. A Comparison on overall performance and computation time across different methods is presented in Table 3.

TABLE 1

A Comparison of F1 scores on the proposed models and baselines on the SMP dataset

| Experiment # | Embeddings and Model | F1 (%) |
|---|---|---|
| 1 | Pre-trained word, LSTM | 78.71 |
| 2 | Randomly initialized word, LSTM | 86.06 |
| 3 | Pre-trained word, randomly initialized char, Word-Char LSTM | 87.86 |

TABLE 1-continued

A Comparison of F1 scores on the proposed models and baselines on the SMP dataset

| Experiment # | Embeddings and Model | F1 (%) |
|---|---|---|
| 4 | Randomly initialized word and char, Word-Char LSTM | 89.51 |

TABLE 2

Results of ensemble of the proposed model and ensemble of baseline model in unweighted F1 scores (%)

| Ensemble | F1(%) |
|---|---|
| Ensemble of Proposed model | 93.55 |
| Ensemble of baseline LSTM | 87.26 |

TABLE 3

Results of the best character-level models against other methods measured by unweighted F1 scores (in percentages)

| Model | F1 (%) on SMP | Development time on SMP |
|---|---|---|
| The proposed single model | 89.51 | Low |
| Ensemble of baseline LSTMs | 87.26 | Low to medium |
| Ensemble of the proposed models | 93.55 | Low to medium |
| N-gram SVM (Li et al., 2017) | 90.89 | Medium, with feature engineering |
| Ensemble of SIR-CNNs (Lu, 2017) | 92.88 | Medium to high |
| Ensemble or LSTMs, domain knowledge (Tang et al., 2017) | 93.91 | High, with feature engineering |

Effectiveness of the Word-Character Approach

As is shown in Table 1, there is an increase comparing experiment 3 to 1 or experiment 4 to 2, with an 9.15% improvement from experiment 1 to experiment 3 and 3.45% from experiment 2 to experiment 4. It is thus verified that the CNN method as described in the Word-Character module is useful for extracting and integrating informative Chinese character level features.

Besides, comparing experiment 1 with experiment 2, or experiment 3 with experiment 4, an interesting finding is observed that even though pre-trained word embeddings are dynamically updated and fine-tuned during training, the result is still worse than using randomly initialized embeddings. This is explained by the fact that the external source that pre-trains the word embeddings does not align well with the task at hand.

To be more specific, in this specific case, the Sogou News Corpus used for pre-training does not necessarily contain contexts similar to the queries in human-computer dialogs, so for the same word, the Sogou embedding vector and the actual vector associated with the SMP task can result in quite different directions if they are projected onto an embedding representation space. Thus for task-specific data, relying on pre-trained vectors can have a diminishing effect on the performance. This is especially true with Chinese data where words can have very different meanings depending on the contexts. Luckily, the Chinese characters have fewer variations and provide a more stable source to form character-level word representations, which can then be easily learned and safely used without exploiting external resources.

Combining Word-Character Models with Ensemble Techniques:

With ensembling, the classification accuracy of ensemble of the proposed character-level models reaches 93.55%, which gives an increase of 6.29% compared to that of ensemble of baseline LSTMs (87.26%). The ensemble method helps reduce variance and brings the best out of the constituent word-character models.

Overall Performance Comparisons:

In this section the work based on the approach disclosed herein is compared with the state-of-the-art works in terms of F1 scores and development time. The ensemble model based on the disclosed approach outperforms models in two of the three works and is on par with the top score model. Table 3 lists the scores and development times of the proposed model, the ensemble of proposed models, and the state-of-the-art works on SMP.

The work of (Li et al., 2017) uses a classical machine learning approach to text classification. They have adopted a one-vs-the-rest SVM classifier in the Lib-SVM package with n-gram character based feature vectors as input, which achieves 90.89% F1 score. They have experimented different combinations of n-grams. In the final model, 1+2+3+4-gram vectors with a dimension of 2642 are used. Feature weights are calculated by tf-idf. The overall development time is medium. Compared to their model, the model based on the disclosed approach described herein has obtained a higher classification accuracy with a neural architecture, and is straightforward to build without feature engineering.

The work of (Lu, 2017) has utilized pre-trained character embeddings as input and an same-structure ensemble of Self-Inhibiting Residual CNNs (SIR-CNNs). The convolution and max pooling are done in 1-D, and character embeddings are trained during training. The result gives a 92.88% F1 score and the development time is medium to high. The performance is better with lower computation time.

The top score comes from an ensemble model of 10 single LSTM (with multiple hidden layers) models along with data-based keyword extraction proposed by (Tang et al., 2017). They have developed a domain keyword based LSTM classifier and applied ensembling techniques to integrate 10 retrained such classifiers of the same parameters, and finally used majority voting to select the final prediction. They have trained word vectors on 10G Weibo (https://weibo.com) data with fine tuning. Due to fairly complicated feature engineering, such as domain keyword extraction, the development time of their model is very high. Instead of ensembling a great number of fine-tuned complex single models with a feature extraction algorithm, the ensemble with the word-character models does not require feature engineering and comprises of less and simpler constituent models, which makes faster training possible while achieving a comparable to the state-of-the-art result. Besides, their best single classifier performance on the test set is not given, so it is not able to compare their single model result and time to ours.

CONCLUSION

In the work as described above, the Chinese intent classification problem is addressed and a low-effort integrated word-character approach that enhances classification accuracy compared to models using only Chinese word embeddings is also proposed. Experiments on the SMP dataset are also run, with different word and character embedding configurations. One single model achieves 89.51% on SMP. One main findings are that the Chinese SMP data benefits more from the character approach, and thus there is no need to rely on pre-trained word embeddings using the proposed method. The proposed word-character module exploits the internal word and character relationships via CNN and pooling, and the embeddings are learned during training by optimizing the same loss function on logits as the word embedding model does.

Taking into account the ensemble method, an improvement from ensembles without characters to those with characters are observed, and the best ensemble achieves 93.55% on SMP, which are on par with the state-of-the-art. The proposed model is easy to implement and train, which greatly reduces the development time compared to works that rely on feature engineering and sophisticated architectures.

Future work could focus on conducting experiments on different pooling strategies and embedding combining methods, for example, instead of giving equal weights to the word and character embeddings when combining. The contributions of word and character embeddings can be figured out by experimenting on various weights. In addition, concatenation instead of weighted average could be used. Another focus will be exploring different ensembling and stacking techniques with the character-level models. Last but not least, mechanisms that could potentially further improve intent classification results can be further investigated.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A processing-circuit-implemented method for determining an intent class of a dialogue sentence input in a language containing information-bearing characters, comprising:
    obtaining at least one set of word embeddings and character embeddings from the dialogue sentence input to thereby generate at least one set of integrated word-character embeddings, each corresponding to one of the at least one set of word embeddings and character embeddings; and
    determining an intent class corresponding to the dialogue sentence input based on the at least one set of integrated word-character embeddings;
    wherein in the obtaining at least one set of word embeddings and character embeddings from the dialogue sentence input to thereby generate at least one set of integrated word-character embeddings, one or more of the at least one set of integrated word-character embeddings is updated during backpropagation.

2. The processing-circuit-implemented method of claim 1, wherein the dialogue sentence input comprises a voice input, and wherein the method further comprises outputting a dialogue based on the determined intent class as at least one of an audio signal and a visual signal.

3. The processing-circuit-implemented method of claim 1, wherein a number of the at least one set of integrated word-character embeddings is more than one, wherein the determining an intent class corresponding to the dialogue sentence input based on the at least one set of integrated word-character embeddings comprises:
    obtaining a prediction result specifying a predicted intent class corresponding to the dialogue sentence input from a model containing each of the more than one set of integrated word-character embeddings; and
    ensembling the prediction result from the model containing the each of the more than one set of integrated word-character embeddings to thereby determine an intent class corresponding to the dialogue sentence input.

4. The processing-circuit-implemented method of claim 3, wherein the obtaining a prediction result specifying a predicted intent class corresponding to the dialogue sentence input from a model containing each of the more than one set of integrated word-character embeddings is realized through a long short-term memory (LSTM) neural network-based approach.

5. The processing-circuit-implemented method of claim 3, wherein the ensembling the prediction result from the model containing the each of the more than one set of integrated word-character embeddings to thereby determine an intent class corresponding to the dialogue sentence is realized through majority voting.

6. The processing-circuit-implemented method of claim 1, wherein in the obtaining at least one set of word embeddings and character embeddings from the dialogue sentence input to thereby generate at least one set of integrated word-character embeddings, either or both of the word embeddings and character embeddings in one or more of the at least one set of word embeddings and character embeddings are randomly initialized.

7. The processing-circuit-implemented method of claim 1, wherein in the obtaining at least one set of word embeddings and character embeddings from the dialogue sentence input to thereby generate at least one set of integrated word-character embeddings, either or both of the word embeddings and character embeddings in one or more of the at least one set of word embeddings and character embeddings are pre-trained.

8. The processing-circuit-implemented method of claim 1, wherein the language comprises at least one logographic language including Chinese.

9. A processing-circuit-implemented method for determining an intent class of a dialogue sentence input in a language containing information-bearing characters, comprising:
    obtaining at least one set of word embeddings and character embeddings from the dialogue sentence input to thereby generate at least one set of integrated word-character embeddings, each corresponding to one of the at least one set of word embeddings and character embeddings; and
    determining an intent class corresponding to the dialogue sentence input based on the at least one set of integrated word-character embeddings;
    wherein the obtaining at least one set of word embeddings and character embeddings from the dialogue sentence input to thereby generate at least one set of integrated word-character embeddings comprises at least one round of the sub-steps of:
    generating a character embedding based input and a word embedding based input from the dialogue sentence input;

generating character embedding vectors and word embedding vectors respectively from the character embedding based input and the word embedding based input;
extracting features from the character embedding vectors to thereby obtain a character feature map;
obtaining a pooled character feature map based on the character feature map; and
integrating the pooled character feature map and the word embedding vectors to thereby obtain integrated word-character embedding vectors;
wherein:
each of the at least round of the sub-steps corresponds to one of the at least one set of integrated word-character embeddings.

10. The processing-circuit-implemented method of claim 9, wherein the extracting features from the character embedding vectors to thereby obtain a character feature map is realized through a 2-D convolutional neural network (CNN)-based approach.

11. The processing-circuit-implemented method of claim 9, wherein the obtaining a pooled character feature map based on the character feature map is realized through a max-pooling operation.

12. The processing-circuit-implemented method of claim 9, wherein in the obtaining a pooled character feature map based on the character feature map, the pooled character feature map has a substantially same dimension as the word embedding vectors.

13. The processing-circuit-implemented method of claim 9, wherein the integrating the pooled character feature map and the word embedding vectors to thereby obtain integrated word-character embedding vectors is realized through a weighted average-based approach.

14. The processing-circuit-implemented method of claim 9, wherein the integrating the pooled character feature map and the word embedding vectors to thereby obtain integrated word-character embedding vectors is realized through a concatenation-based approach.

15. The processing-circuit-implemented method of claim 9, wherein each of the at least one round of the sub-steps further comprises, prior to the generating a character embedding based input and a word embedding based input from the dialogue sentence input:
preprocessing the dialogue sentence input allowing tokenization thereof at a word level.

16. A system, comprising:
at least one processing circuit; and
memory storing instructions that, when executed by the at least one processing circuit, cause the system to:
obtain at least one set of word embeddings and character embeddings from a dialogue sentence input to thereby generate at least one set of integrated word-character embeddings, each corresponding to one of the at least one set of word embeddings and character embeddings; and
determine an intent class corresponding to the dialogue sentence input based on the at least one set of integrated word-character embeddings;
wherein the instructions causing the system to obtain at least one set of word embeddings and character embeddings from a dialogue sentence input to thereby generate at least one set of integrated word-character embeddings, each corresponding to one of the at least one set of word embeddings and character embeddings comprise:
a first instruction causing the system to generate a character embedding based input and a word embedding based input from the dialogue sentence input;
a second instruction causing the system to generate character embedding vectors and word embedding vectors respectively from the character embedding based input and the word embedding based input;
a third instruction causing the system to extract features from the character embedding vectors to thereby obtain a character feature map;
a fourth instruction causing the system to obtain a pooled character feature map based on the character feature map; and
a fifth instruction causing the system to integrate the pooled character feature map and the word embedding vectors to thereby obtain integrated word-character embedding vectors.

17. The system of claim 16, wherein the instructions further cause the system to preprocess the dialogue sentence input allowing tokenization thereof at a word level.

18. The system of claim 16, wherein the system is further configured to output a dialogue based on the determined intent class as at least one of an audio signal and a visual signal.

19. The system of claim 16, wherein the instructions stored in the memory further comprise:
a sixth instruction causing the system to obtain a prediction result specifying a predicted intent class corresponding to the dialogue sentence input from a model containing the integrated word-character embedding vectors.

20. The system of claim 19, wherein the instructions stored in the memory further comprise:
a seventh instruction causing the system to ensemble the prediction result from more than one model, each containing one set of integrated word-character embedding vectors to thereby determine an intent class corresponding to the dialogue sentence input.

* * * * *